(12) United States Patent
Nakanishi et al.

(10) Patent No.: US 6,502,857 B2
(45) Date of Patent: Jan. 7, 2003

(54) AIRBAG APPARATUS

(75) Inventors: Ryosuke Nakanishi, Tokyo (JP); Yasushi Masuda, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/909,855

(22) Filed: Jul. 23, 2001

(65) Prior Publication Data

US 2002/0014763 A1 Feb. 7, 2002

(30) Foreign Application Priority Data

Jul. 27, 2000 (JP) ......................................... 2000-226935

(51) Int. Cl.[7] ............................................... B60R 21/28
(52) U.S. Cl. ..................... 280/740; 280/742; 280/730.2
(58) Field of Search .......................... 280/728.2, 730.1, 280/730.2, 740, 741, 742, 743.1

(56) References Cited

U.S. PATENT DOCUMENTS

| | | | |
|---|---|---|---|
| 6,164,688 A | | 12/2000 | Einsiedel et al. |
| 6,199,898 B1 | * | 3/2001 | Masuda et al. ............. 280/729 |
| 6,325,409 B1 | * | 12/2001 | Fischer ...................... 280/729 |

FOREIGN PATENT DOCUMENTS

| | | |
|---|---|---|
| DE | 197 38 741 | 3/1999 |
| JP | 11-301394 | 11/1999 |
| JP | 11-314555 | 11/1999 |

* cited by examiner

*Primary Examiner*—Paul N. Dickson
*Assistant Examiner*—Faye M. Fleming
(74) *Attorney, Agent, or Firm*—Kanesaka & Takeuchi

(57) ABSTRACT

In case of emergency such as a side crash of the vehicle, when gas from the inflator flows quickly forward through the gas inlet passage and reaches the closed end at the front end of the gas inlet passage, the internal pressure in the gas inlet passage increases. Then, gas is blown from the gas exhaust ports into the airbag and the airbag is inflated and deployed. At this moment, the gas exhaust ports open in the direction along the inner surface of the side portion the vehicle body, so that gas is blown from the gas exhaust ports in the same direction and the airbag is inflated and deployed downwardly like a curtain along the inner surface of the side portion of the vehicle body. In this inflation and deployment of the airbag, the airbag is inflated and deployed quickly, smoothly and reliably in a relatively narrow space between the inner surface of the side portion of the vehicle body and the passenger.

10 Claims, 3 Drawing Sheets

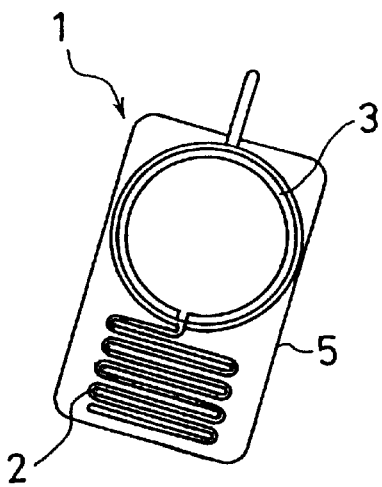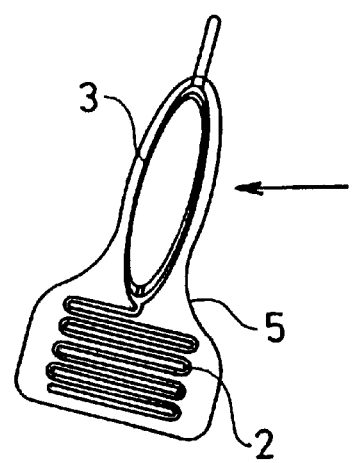
Fig. 3(a)   Fig. 3(b)
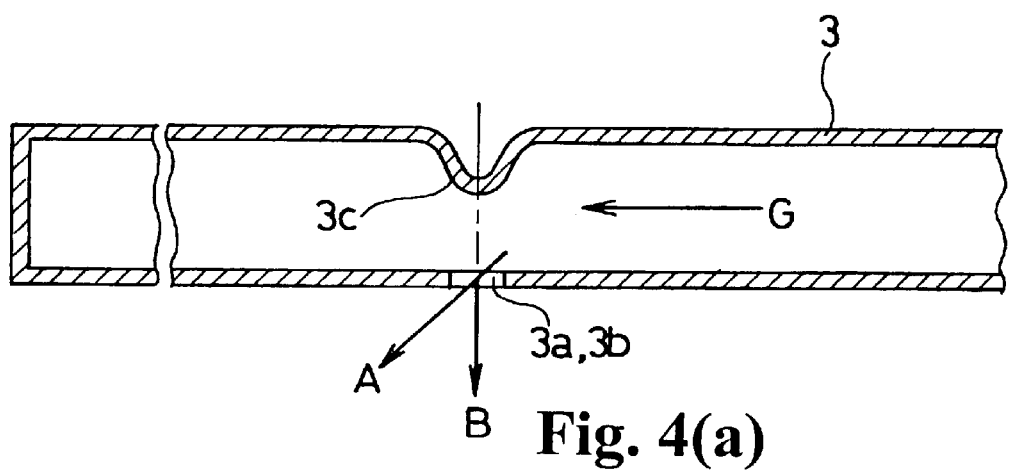
Fig. 4(a)
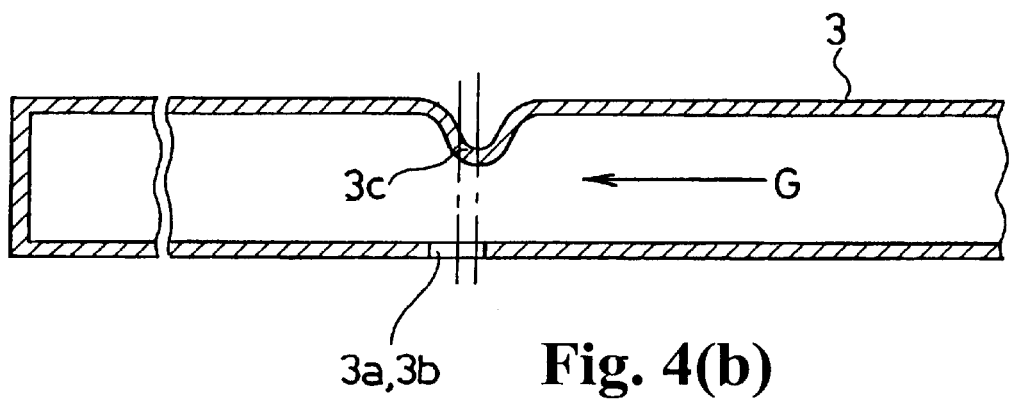
Fig. 4(b)

AIRBAG APPARATUS

BACKGROUND OF THE INVENTION AND RELATED ART STATEMENT

The present invention relates to a technical field of the airbag apparatus in which the airbag stored near the boundary between the ceiling of the vehicle body and the side portion of the vehicle body along the fore-and-aft direction of the vehicle body is inflated and deployed like a curtain downwardly of the vehicle body by gas from an inflator in case of emergency such as a side crash of the vehicle where a load in excess of a prescribed value is applied to the side surface of the vehicle body, and more specifically, to the technical field of the airbag apparatus being provided with a gas inlet passage for introducing gas from the inflator into the airbag.

The airbag apparatus of this type is constructed in such a manner that the airbag is inflated and deployed along the window or the like on the side door by gas from the inflator in case of emergency such as a side crash of the vehicle where a load in excess of a prescribed value is applied to the side surface of the vehicle to prevent the passenger from being crashed to the side portion of the vehicle body and protect him/her.

Incidentally, in the airbag apparatus in this arrangement, the airbag is arranged at the upper portion of the vehicle body extending longitudinally in the fore-and-aft direction of the vehicle along the window or the like on the side door near the boundary between the ceiling of the vehicle and the side portion of the vehicle body in a folded state, and constructed so as to be inflated downwardly of the vehicle body by gas introduced into the airbag via the front or rear end of the airbag. However, since the airbag is elongated in the fore-and-aft direction of the vehicle, the timing of introduction of gas introduced from the front or the rear end of the airbag differs depending on the positions in the fore-and-aft direction of the airbag, and thus it is difficult to inflate and deploy the airbag uniformly across the fore-and-aft direction.

Accordingly, the airbag apparatus in which a gas inlet passage is disposed in the fore-and-aft direction in the airbag having the prescribed number of gas exhaust ports at prescribed intervals, so that the airbag is inflated and deployed by introducing gas from the inflator in the fore-and-aft direction of the airbag through the gas inlet passage, and blowing off gas from the respective gas exhaust ports into the airbag is disclosed for example in Japanese Patent Application Publication No. 11-314555 and Japanese Patent Application Publication No. 11-301394. According to the airbag apparatus disclosed in these patent publications, gas from the inflator is introduced in the fore-and-aft direction of the airbag, and thus the airbag is inflated and deployed more uniformly across the fore-and-aft direction.

However, in the airbag apparatus disclosed in the respective patent publications described above, the airbag is merely inflated and deployed, but not inflated and deployed so as to protect the passenger more effectively.

In the conventional automotive vehicles or the like, a resilient member such as a garnish is provided in the side portion of the vehicle body, so that it can protect the passenger when the passenger abuts against the side portion of the vehicle body by a load applied to the side portion of the vehicle body, which is not heavy enough to inflate and deploy the airbag. However, when the airbag apparatus is provided in the side portion of the vehicle body, the gas inlet passage is located at the upper portion of the vehicle body near the boundary describe above, whereby it is difficult to protect the passenger effectively when he/she abuts against the side portion of the vehicle body.

With such a circumstance in view, an object of the present invention is to control inflation and deployment of the airbag and to provide an airbag apparatus that enable the airbag to be inflated and deployed so that the passenger is protected more effectively.

Another object of the present invention is to provide an airbag apparatus that enables the airbag to protect the passenger more effectively when the passenger abuts against the side portion of the vehicle body by a load that is not heavy enough to inflate and deploy the airbag.

SUMMARY OF THE INVENTION

In order to solve the problem described above, the invention is an airbag apparatus at least comprising: an airbag stored in the upper portion of the side portion of the vehicle body along the fore-and-aft direction of the vehicle body; and a gas inlet passage disposed in the airbag in the fore-and-aft direction for introducing gas from the inflator into the airbag in the fore-and-aft direction and then blowing it into the airbag from the gas exhaust port, so that the airbag is inflated and deployed toward the lower portion of the vehicle body by blowing gas introduced through the gas inlet passage into the airbag through the gas exhaust port in case of emergency such as a side crash of the vehicle, characterized in that an airbag inflation and deployment control means for controlling inflation and deployment of the airbag is provided.

The airbag inflation and deployment control means controls the direction of inflation and deployment of the airbag in such a manner that the airbag inflates and deploys along the inner surface of the side portion of the vehicle body.

The airbag inflation and deployment control means is mounted so that the gas exhaust port opens along the inner surface of the side portion of the vehicle body.

The invention, in one embodiment, is characterized in that the airbag inflation and deployment control means controls inflation and deployment of the airbag by controlling the direction of gas blown from the gas exhaust port so that the direction of gas blown at the beginning of inflation and deployment of the airbag differs from the direction of gas blown during subsequent inflation and deployment of the airbag.

The invention is characterized in that the airbag inflation and deployment control means is formed of a projection projecting inwardly of the gas inlet passage in conjunction with the gas exhaust port.

The invention is characterized in that the gas inlet passage is formed of material such as aluminum or the like that is not deformed by a load applied by the passenger when he/she abuts therewith under the normal condition, but is deformed when the passenger abuts therewith with a relatively heavy load, which is not less than a prescribed value but not heavy enough to inflate and deploy the airbag, is applied to the side surface of the vehicle.

[Operation]

In the airbag apparatus of the present invention in this structure, inflation and deployment of the airbag are controlled in various manners by the airbag inflation and deployment control means, and thus the airbag is inflated and deployed so that the passenger is protected more effectively.

Especially, in one embodiment, the direction of inflation and deployment of the air bag is controlled to the direction along the inner surface of the side portion of the vehicle body by the airbag inflation and deployment control means. In this arrangement, the airbag can be inflated and deployed quickly, smoothly and reliably in the relatively narrow space between the inner surface of the side portion of the vehicle body and the passenger along this inner surface. Therefore, the airbag that is inflated and deployed in such a manner, the body of the passenger such as the head or the like is reliably prevented from being crashed against the side portion of the vehicle body in case of emergency, and thus the passenger is protected more effectively.

In one embodiment, the direction of deployment of the airbag can be controlled only by orienting the gas exhaust port of the gas inlet passage in the direction along the inner surface of the side portion of the vehicle body, the construction of the airbag inflation and deployment control means can be significantly simplified.

In one embodiment, the direction of gas blown from the gas exhaust port is controlled to be different between the timing at the beginning of inflation and deployment and during subsequent inflation and deployment of the airbag by the airbag inflation and deployment control means. In this arrangement, the direction of gas blown at the beginning of inflation and deployment of the airbag can be suitably controlled, and thus the airbag starts inflation and deployment so as to slide into the narrow space between the passenger and the inner surface of the side portion of the vehicle body at the beginning. Then the airbag is inflated and deployed by relatively large amount of gas blown during subsequent inflation and deployment of the airbag further quickly and sizably. In this way, since inflation and deployment of the airbag are controlled in two stages of initial inflation and deployment, and subsequent main inflation and deployment, the airbag can be inflated and deployed more quickly and reliably. Therefore, the body of the passenger such as the head or the like can be prevented more reliably from being crashed against the side portion of the vehicle body in case of emergency by the airbag inflated and deployed in such a manner and thus the passenger can be protected more effectively.

In a variant wherein inflation and deployment of the airbag can be controlled only by providing a projection projecting into the gas inlet passage in conjunction with the gas exhaust port, the construction of the airbag inflation and deployment control means can be significantly simplified.

When the body of the passenger such as the head abuts against the gas inlet passage relatively strongly by applying a load, which is not heavy enough to inflate and deploy the airbag, to the side surface of the vehicle body, the gas inlet passage deforms. Deformation of the gas inlet passage can absorb and alleviate the impact energy of the passenger against the gas inlet passage upon crash and protect the passenger.

BRIEF DESCRIPTION OF THE DRAWINGS

FIG. 3(a) is a cross sectional view of an airbag and a gas inlet passage of the first example showing the normal state where the gas inlet port is not deformed;

FIG. 3(b) is a cross sectional view showing the state in which the gas inlet port is deformed;

FIG. 4(a) is a cross sectional view showing a part of the gas inlet passage of the second example of the embodiment according to the present invention;

FIG. 4(b) is a cross sectional view showing a part of the alternative example of gas inlet passage of the second example.

DETAILED DESCRIPTION OF THE PREFERRED EMBODIMENTS

Figure 1:
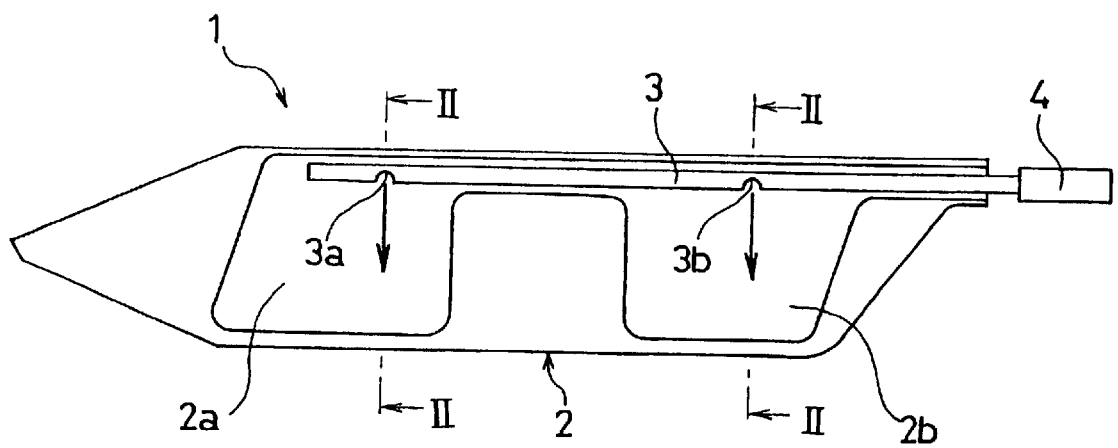
FIG. 1 is a diagrammatic sketch of the first example of an embodiment of the airbag apparatus according to the present invention.

Referring now to the drawings, an embodiment of the present invention will be described.

Figure 2:
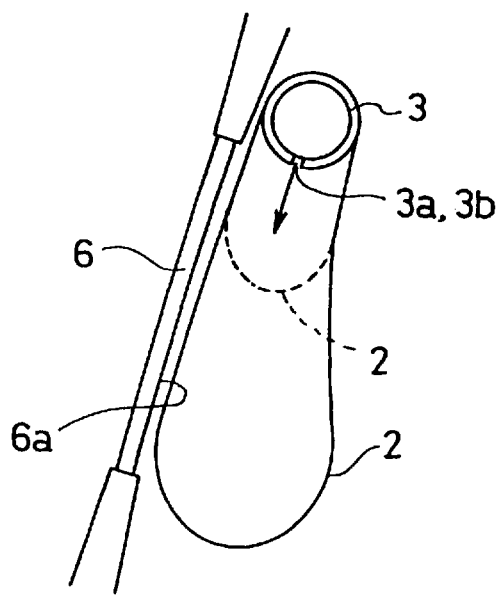
FIG. 2 is a cross sectional view taken along the line II—II in FIG. 1.

FIG. 1 is a diagrammatic sketch of the first example of the embodiment of the airbag apparatus according to the present invention, FIG. 2 is a cross sectional view taken along the line II—II in FIG. 1, and FIGS. 3(a) and 3(b) show an airbag and gas inlet passage of the first example, in which FIG. 3(a) is a cross sectional view showing the normal state where the gas inlet passage is not deformed, and FIG. 3(b) is a cross sectional view showing the state where the gas inlet passage is deformed.

As shown in FIG. 1, the airbag apparatus 1 at least comprises, as in the conventional case, an airbag 2 disposed in the upper portion of the side portion of the vehicle body near the boundary between the ceiling of the vehicle body and the side portion of the vehicle body along the window or the like of the side door, which is not shown, so as to be elongated in the fore-and-aft direction of the vehicle body (In FIG. 1, the airbag 2 in the inflated and deployed state is shown.), and a tubular gas inlet passage 3 provided in the airbag 2 so as to extend in the fore-and-aft direction of the vehicle body and closed at the front end, and an inflator 4 connected to the rear end of the gas inlet passage 3 for generating gas.

The airbag 2 is stored in the cover 5 folded as shown in FIG. 3(a). The cover 5 is constructed to be broken by inflating and deploying force of the airbag 2, or opened downwardly by the inflating and deploying force.

The airbag 2 is provided with inflating portions 2a, 2b corresponding to the front seat and the rear seat respectively, and the gas inlet passage 3 is provided with gas exhaust ports 3a, 3b formed corresponding to the inflating portions 2a, 2b respectively and constructed of a prescribed number of holes opening into the inflating portions 2a, 2b. As shown in FIG. 2, both of the gas exhaust ports 3a, 3b are provided so as to open downwardly along the inner surface 6a of the side portion 6 of the vehicle body such as a window on the side door. In this case, the openings of the gas exhaust port 3a, 3b are not necessary to be oriented completely along the inner surface 6a of the side portion 6 of the vehicle body, but it must simply be set so that the airbag 2 is inflated and deployed practically along the inner surface 6a of the side portion 6 of the vehicle body as described later. Though there are two gas exhaust ports 3a, 3b provided in the example shown in the figure, it is not limited thereto, and may be provided as many as the desired number.

In addition, the gas inlet passage 3 is formed of a cylindrical aluminum tube, and has a function such that it is not deformed by a load which is applied when the passenger abuts against therewith under the normal condition as shown in FIG. 3(a), but is deformed when the passenger abuts relatively strongly against therewith by a load not less than a prescribed value but not heavy enough to inflate and deploy the airbag 2 is applied to the side surface of the vehicle body as shown in the same figure (b). However, any material or configuration in cross section other than the cylindrical aluminum tube can be employed for the gas inlet passage 3 as far as it has the function described above.

In the airbag apparatus of the first example in this arrangement, the airbag 2 is folded as shown in FIG. 3(a) under the normal state. When a load not less than a prescribed value is applied to the side surface of the vehicle body in case of emergency such as a side crash of the vehicle or the like, inflator 4 is actuated to generate gas as well known. Gas flows quickly forward in the gas inlet passage 3, and when it reaches the closed end at the front end of the gas inlet passage 3, the internal pressure in the gas inlet passage 3 suddenly increases. Then gas is blown from the gas exhaust ports 3a, 3b into the respective inflating portions 2a, 2b of the airbag 2 and inflates these inflating portions 2a, 2b, and the inflating force breaks or opens the cover 5 downwardly to inflate and deploy the airbag 2. In this case, since the gas exhaust port 3a, 3b open in the direction along the inner surface 6a of the side portion 6 of the vehicle body, as shown in FIG. 2, gas is blown from the gas exhaust ports 3a, 3b in the same direction, and the airbag 2 is inflated and deployed like a curtain along the inner surface 6a of the side portion 6 of the vehicle body toward the lower portion of the vehicle body. In other words, the airbag 2 is controlled in its direction of deployment, and inflated and deployed downwardly of the vehicle body along the inner surface 6a of the side portion 6 of the vehicle body. Therefore, the gas exhaust ports 3a, 3b constitute the airbag inflation and deployment control means of the present invention.

By controlling the direction of deployment of the airbag 2 in this way, the airbag 2 can be inflated and deployed quickly, smoothly and reliably in the relatively narrow space between the inner surface 6a of the side portion 6 of the vehicle body and the passenger. Therefore, the airbag 2 inflated and deployed in such a manner reliably prevents the body of the passenger such as the head from being crashed against the side portion of the vehicle body in case of emergency, and thus the passenger can be protected more effectively.

In addition, since the direction of deployment of the airbag 2 can be controlled simply by opening the gas exhaust ports 3a, 3b of the gas inlet passage 3 in the direction along the inner surface 6a of the side portion 6 of the vehicle body, the construction of the airbag inflation and deployment control means can be significantly simplified.

When the body of the passenger such as the head abuts against the gas inlet passage 3 relatively hard by a load applied to the side surface of the vehicle, which is not heavy enough to inflate and deploy the airbag 2 or to activate the inflator 4 and generate gas, the gas inlet passage 3 is subjected to plastic deformation as shown in FIG. 3(b). The impact energy of the passenger against the gas inlet passage 3 upon crash is absorbed and alleviated by the plastic deformation of the gas inlet passage 3, thereby protecting the passenger.

FIG. 4(a) is a cross sectional view showing a part of the gas inlet passage of the second example of the embodiment according to the present invention, and FIG. 4(b) is a cross sectional view showing a part of the alternative example of gas inlet passage of the second example. The detailed description will be omitted by designating the same reference numerals to the same parts as in the first example described above.

The gas inlet passage 3 of the airbag apparatus 1 in the second example is formed with a conical projection 3c projecting inwardly of the gas inlet passage 3 at the position opposed to the gas exhaust ports 3a, 3b. The central position of the projection 3c is determined to the same position as the central position of the gas exhaust ports 3a, 3b in terms of the longitudinal direction. The projection 3c forms a reduced diameter portion of which the inner diameter is reduced in the gas inlet passage 3. The projection 3c may be a circumferentially extending projection of an annular shape having inclined surface with respect to the longitudinal direction of the gas inlet passage 3, or it may be other configurations such as rectangular or trapezoidal in cross section. The projection 3c may be formed by pressing the gas inlet passage 3 from the outer peripheral surface to make a dent inwardly, and other arbitrary method can also be employed. Other structures of the second airbag apparatus 1 is the same as the airbag apparatus of the first example described above.

In the airbag apparatus 1 of the second example in this structure, when gas from the inflator 4 flows through the gas inlet passage 3 in the direction shown by the arrow G in case of emergency described above and reaches the reduced diameter portion where the projection 3c resides, a part of gas flows through the gas exhaust ports 3a, 3b by the reduced diameter portion and blown through these gas exhaust ports 3a, 3b into the inflating portions 2a, 2b of the airbag 2 in the direction A diagonally toward the lower front, and remaining gas passes through the reduced diameter portion to flow further forward in the gas inlet passage 3. This flow of gas is narrowed at the reduced diameter portion and thus the internal pressure increases in the portion of the gas inlet passage 3 on the rear side in comparison with the reduced diameter portion (upstream of the gas flow), and the flow of gas is partly urged toward the direction orthogonal to the gas inlet passage 3 by the inner wall of the reduced diameter portion. Therefore, the component of gas flowing forward (longitudinally of the gas inlet passage 3) and the component of gas flowing in the direction orthogonal to the longitudinal direction of the gas inlet passage 3 are believed to allow a part of gas to be blown in the direction A diagonally toward the lower front.

The airbag 2 is started to inflate and deploy in such a manner that it slides into the narrow space between the passenger and the inner surface 6a of the side portion 6 of the vehicle body by gas blown from the gas exhaust ports 3a, 3b diagonally toward the lower front A. On the other hand, when gas passed through the reduced diameter portion reaches the closed end at the front end of the gas inlet passage 3, the internal pressure across the gas inlet passage 3 suddenly increases. Accordingly, the relatively large amount of gas is blown into the airbag 2 from the gas exhaust ports 3a, 3b along the directly downward direction B orthogonal to the longitudinal direction of the gas inlet passage 3, and thus the airbag 2 is inflated and deployed further quickly and sizably. Therefore, the projection 3c constitutes the airbag inflation and deployment control means of the present invention.

In this way, in the airbag apparatus of the second example, inflation and deployment of the airbag 2 is controlled in two stages of the initial inflation and deployment by gas initially blown into the direction A diagonally toward the lower front and the main inflation and deployment by gas subsequently blown into the right downward direction B, and thus the airbag 2 is inflated and deployed more quickly and reliably. Since inflation and deployment of the airbag 2 is controlled only by providing the projection 3c projecting into the gas inlet passage 3 in conjunction with the gas exhaust ports 3a, 3b, the construction of the airbag inflation and deployment control means can be significantly simplified.

Especially, the projection 3c can easily be formed by pressing the outer peripheral surface of the tubular gas inlet passage 3 to form a recess. In this case, the recess can easily be formed by employing an aluminum tube for the gas inlet passage 3.

Other effects of the second example are the same as the first example described above.

In the second example described above, the central position of the projection 3c and the central position of the gas exhaust ports 3a, 3b are in agreement with each other in terms of the longitudinal direction of the gas inlet passage 3. However, it is also possible to offset the central position of the projection 3c backward (toward the upstream of the gas flow) from the central position of the gas exhaust ports 3a, 3b as shown in FIG. 4(b), and also to offset the central position of the projection 3c frontward (toward the downstream of the gas flow) from the central position of the gas exhaust ports 3a, 3b, though it is not shown. In addition to providing the projection 3c at the position opposed to the gas exhaust ports 3a, 3b, it is also possible to provide the projection 3c at the position in conjunction with the gas exhaust ports 3a, 3b, but not at the position opposed to the gas exhaust ports 3a, 3b. In this way, by determining the position of the projection 3c in various ways, the initial gas blow-off direction can be changed not only into the direction A diagonally toward the lower front, but also into the composite direction of the direction orthogonal to the gas inlet passage 3 and the direction toward the lower portion of the vehicle body or the like.

In the second example, the gas exhaust ports 3a, 3b are provided so as to open downward along the inner surface 6a of the side portion 6 of the vehicle body as in the first example. However, these gas exhaust ports 3a, 3b may be provided so as to simply open directly downward.

Figure 5A:
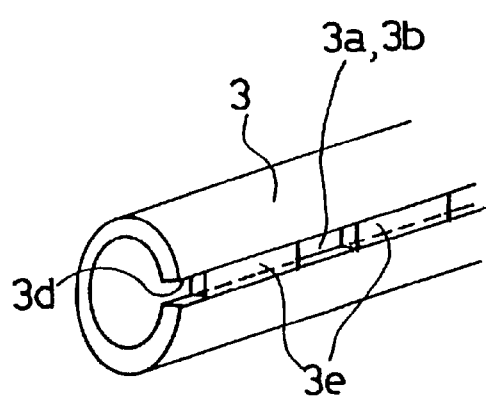
FIG. 5(a) and (b) are partial perspective views showing the alternatives of the gas inlet passage respectively.
Figure 5B:
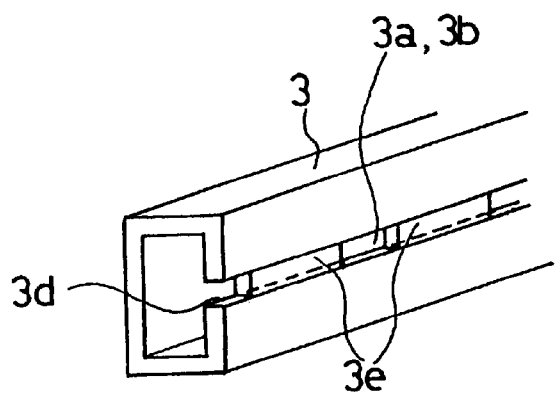

In addition, instead of the tubular gas inlet passage 3, it is also possible to employ a gas inlet passage 3 formed of an elongated member having an elongated notch 3d extending in the longitudinal direction as shown in FIG. 5(a) and (b). In this case, the prescribed position of the elongated notch 3d is sealed by seals 3e so as to form gas exhaust ports 3a, 3b opening toward the inflating portions 2a, 2b of the airbag 2.

As is apparent from the description above, according to the airbag apparatus of the present invention, the airbag can be inflated and deployed so as to protect the passenger more effectively by controlling inflation and deployment of the airbag by the airbag inflation and deployment control means as needed in various ways.

Especially, according to one embodiment of the invention, the direction of inflation and deployment of the airbag is controlled to the direction along the inner surface of the side portion of the vehicle body by the airbag inflation and deployment control means, and thus the airbag can be inflated and deployed quickly, smoothly and reliably into the relatively narrow space between the inner surface of the side portion of the vehicle body and the passenger along the inner surface. Accordingly, the crash of the body of the passenger such as the head against the side portion of the vehicle body in case of emergency can be prevented more reliably and thus the passenger can be protected more effectively.

According to a variation of the invention, since the direction of deployment of the airbag is controlled only by opening the gas exhaust port of the gas inlet passage in the direction along the inner surface of the side portion of the vehicle body, the construction of the airbag inflation and deployment control means can be significantly simplified.

According to another variation of the invention, since the airbag inflation and deployment control means controls the gas blow-off direction so that the direction of gas blown at the beginning of inflation and deployment of the airbag differs from the direction of gas blown during subsequent inflation and deployment of the airbag, the initial inflation and deployment of the airbag can be started by sliding into the narrow space between the passenger and the inner surface of the side portion of the vehicle body at the beginning, and then the subsequent main inflation and deployment of the airbag can be performed more quickly and sizably. In this way, inflation and deployment of the airbag can be controlled in two stages of the initial inflation and deployment and the subsequent main inflation and deployment, and thus the airbag can be inflated and deployed more quickly and reliably. Therefore, the crash of the body of the passenger such as the head against the side portion of the vehicle body can be reliably prevented in case of emergency and thus the passenger can be protected more effectively.

In addition, according to a further embodiment of the invention, since inflation and deployment of the airbag is controlled only by providing a projection extending into the gas inlet passage in conjunction with the gas exhaust port, the structure of the airbag inflation and deployment control means can be significantly simplified.

According to a further modification of the invention, when the body of the passenger such as the head abuts against the gas inlet passage relatively strongly by applying a load, which is not heavy enough to inflate and deploy the airbag, to the side surface of the vehicle body, the gas inlet passage deforms. Therefore, this deformation of the gas inlet passage can absorb and alleviate the impact energy of the passenger against the gas inlet passage upon crash and protect the passenger.

What is claimed is:

1. An airbag apparatus comprising:
    an airbag to be stored in an upper side portion of a vehicle body along a fore-and-aft direction thereof;
    an inflator;
    a gas inlet conduit connected to the inflator to extend in the fore-and-aft direction and disposed in the airbag;
    gas ports formed in the inlet conduit for introducing gas from the inflator into the airbag through the inlet conduit to inflate and deploy the airbag toward a lower portion of the vehicle body by blowing the gas introduced through the gas inlet conduit into the airbag through the gas ports in an emergency of the vehicle; and
    inflation and deployment control means formed in the inlet conduit for controlling inflation and deployment of the airbag, said inflation and deployment control means being formed of at least one projection situated inside the inlet conduit at a side opposite to one of the gas ports and located substantially immediately above said one of the gas ports for controlling gas flow in the inlet conduit.

2. An airbag apparatus as set forth in claim 1, wherein said inflation and deployment control means controls a direction of inflation and deployment of the airbag in such a manner that said airbag inflates and deploys downwardly and along an inner surface of a side portion of the vehicle body.

3. An airbag apparatus as set forth in claim 2, wherein said gas ports formed in said gas inlet conduit are positioned such that said gas ports open along said inner surface of the side portion of the vehicle body, said inflation and deployment control means being positioned to control a direction of the gas flowing through said gas ports.

4. An airbag apparatus as set forth in claim 1, wherein said airbag inflation and deployment control means controls inflation and deployment of said airbag by controlling a gas blow-off direction from said gas ports so that a direction of gas blown at a beginning of inflation and deployment of said airbag differs from a direction of gas blown during subsequent continued inflation and deployment of said airbag.

5. An airbag apparatus as set forth in claim 1, wherein said gas inlet conduit is formed of material that is not deformed by a load applied by contact from a passenger under a normal condition, but is deformed by a passenger contact applying a relatively heavy load which is less than a load resulting from contact produced by such impact with the vehicle to inflate and deploy said airbag.

6. An airbag apparatus as set forth in claim 1, wherein said inflation and deployment control means produces a pressure and velocity change in the gas flowing in said inlet conduit in a vicinity of each said gas port.

7. An airbag apparatus as set forth in claim 1, wherein said inlet conduit has a dent at a side of said projection so that the projection is formed by deforming the inlet conduit.

8. An airbag apparatus as set forth in claim 7, wherein said projection is formed at a side slightly close to the inflator relative to the gas port where the projection is formed to direct the gas to the gas port.

9. An airbag apparatus as set forth in claim 1, wherein said inlet conduit has an elongated notch extending in the fore-and-aft direction, and seals for partly closing the notch to form the gas ports in the notch.

10. An airbag apparatus as set forth in claim 1, wherein said gas inlet conduit is made of aluminum.

\* \* \* \* \*